(12) United States Patent
Hossain et al.

(10) Patent No.: US 8,577,914 B2
(45) Date of Patent: Nov. 5, 2013

(54) APIS DISCOVERY SERVICE

(75) Inventors: Monsur Hossain, Chicago, IL (US);
Joseph Gregorio, Mountain View, CA (US); Anton Lopyrev, San Francisco, CA (US); Mark Edward Stahl, Jersey City, NJ (US)

(73) Assignee: Google Inc., Mountain View, CA (US)

( * ) Notice: Subject to any disclaimer, the term of this patent is extended or adjusted under 35 U.S.C. 154(b) by 14 days.

(21) Appl. No.: 13/110,866

(22) Filed: May 18, 2011

(65) Prior Publication Data
US 2012/0296929 A1   Nov. 22, 2012

(51) Int. Cl.
*G06F 17/30* (2006.01)

(52) U.S. Cl.
USPC .......................................................... 707/769

(58) Field of Classification Search
None
See application file for complete search history.

(56) References Cited

U.S. PATENT DOCUMENTS

| | | | |
|---|---|---|---|
| 6,516,311 B1 * | 2/2003 | Yacoby et al. ..................... | 1/1 |
| 7,177,867 B2 * | 2/2007 | Stringer-Calvert et al. ......... | 1/1 |
| 2003/0074402 A1 * | 4/2003 | Stringer-Calvert et al. .. | 709/203 |
| 2006/0053157 A1 * | 3/2006 | Pitts ............................. | 707/102 |
| 2007/0033167 A1 * | 2/2007 | Basu et al. ...................... | 707/3 |
| 2008/0163264 A1 * | 7/2008 | Berajawala et al. .......... | 719/328 |
| 2011/0099159 A1 * | 4/2011 | Trevor et al. .................. | 707/709 |
| 2012/0069131 A1 * | 3/2012 | Abelow ...................... | 348/14.01 |

OTHER PUBLICATIONS

"Application programming interface", http://en.wikipedia.org/wiki/Application_programming_interface, pp. 1-8, downloaded May 5, 2011, last modified Apr. 29, 2011.
"Representational State Transfer", http://en.wikipedia.org/wiki/Representational_State_Transfer, pp. 1-9, downloaded May 6, 2011, last modified May 6, 2011.
"JSON", http://en.wikipedia.org/wiki/JSON, pp. 1-10, downloaded May 4, 2011, last modified May 3, 2011.
"Web Services Description Language", http://en.wikipedia.org/wiki/Web_Services_Description_Language, pp. 1-6, downloaded May 5, 2011, last modified Apr. 13, 2011.
"Open Data Protocol", http://en.wikipedia.org/wiki/Open_Data_Protocol, p. 1, downloaded May 5, 2011, last modified Apr. 6, 2011.

* cited by examiner

*Primary Examiner* — Bai D. Vu
(74) *Attorney, Agent, or Firm* — Sterne, Kessler, Goldstein & Fox PLLC (57) ABSTRACT

The APIs Discovery Service is a service that exposes machine readable metadata about APIs, enabling users to build client libraries, IDE plugins, and other tools that interact with these APIs.

19 Claims, 5 Drawing Sheets

APIS DISCOVERY SERVICE

BACKGROUND

1. Field

This field is generally related to managing access to metadata related to application programming interfaces (APIs).

2. Related Art

Application programming interfaces (APIs) are used in software engineering to help define ways to access and communicate with software programs. For example, an application programming interface (API) may define a particular set of rules and specifications that software programs can follow to communicate with each other. APIs may allow an interface between different software programs and facilitate their interaction, similar to the way the user interface facilitates interaction between humans and computers.

An API may be created for applications, libraries, operating systems, etc., as a way of defining their "vocabularies" and resources request conventions (e.g. function calling conventions). An API may include specifications for routines, data structures, object classes and protocols used to communicate between the consumer program and the implementer program of the API.

APIs may act as abstractions that describe an interface for the interaction with a set of functions used by components of a software system. The software providing the functions described by an API is said to be an implementation of the API.

The term "API" may be used to refer to a complete interface, a single function, or even a set of APIs provided by an organization. Thus, the scope of meaning is usually determined by the context of usage.

Past approaches such as Web Services Description Language (WSDL) have used technology such as XML (eXtended Markup Language) to represent interfaces between various web services and APIs. However, alternative technologies such as JSON (JavaScript Object Notation) and HTTPS (Hypertext Transfer Protocol Secure) offer efficient and effective ways to represent and transmit metadata about APIs in machine-readable formats that can facilitate development of client libraries, IDE plugins, and other tools for interacting with APIs. Moreover, other formats and protocols may facilitate uses of APIs in new and flexible ways.

BRIEF SUMMARY

Embodiments relate to managing metadata related to APIs. For example, embodiments provide an APIs Discovery Service that exposes machine readable metadata about APIs, enabling users to build client libraries, IDE plugins, and other tools that interact with these APIs.

Present approaches have not yet taken full advantage of the potential ability to facilitate and automate interactions with APIs by representing metadata related to the APIs in a standardized machine-readable format and accessing the metadata by using a network protocol.

In a first embodiment, a computer-implemented method is provided for managing access to metadata related to application programming interfaces (APIs). A request is received for metadata, at a server, related to a supported API from an API client. Next, an API directory data repository is searched, at the server, to find the directory entry corresponding with the supported. API. Finally, a discovery document is retrieved from the directory data repository at the server, based on information from the directory entry, that contains machine-readable metadata related to the supported API.

In a second embodiment, a system manages access to metadata related to APIs. The system includes one or more processors, configured to receive a request for metadata at a server related to a supported API from an API client. The system further includes a directory data repository, configured to store directory entries and discovery documents at the server. The system also includes a directory data searching unit, configured to search the directory data repository at the server to find the directory entry corresponding with the supported API. The system finally includes a discovery document retrieval unit, configured to retrieve a discovery document from the directory data repository at the server, based on information from the directory entry, that contains machine-readable metadata related to the supported API.

In a third embodiment, a computer readable storage medium has instructions stored thereon that, when executed by one or more processors, cause the processors to execute the method for managing metadata related to APIs as described above.

Further embodiments, features, and advantages of the invention, as well as the structure and operation of the various embodiments of the invention are described in detail below with reference to accompanying drawings.

BRIEF DESCRIPTION OF THE FIGURES

The accompanying drawings, which are incorporated herein and form a part of the specification, illustrate the present invention and, together with the description, further serve to explain the principles of the invention and to enable a person skilled in the pertinent art to make and use the invention.

The drawing in which an element first appears is typically indicated by the leftmost digit or digits in the corresponding reference number. In the drawings, like reference numbers may indicate identical or functionally similar elements.

DETAILED DESCRIPTION OF EMBODIMENTS

In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
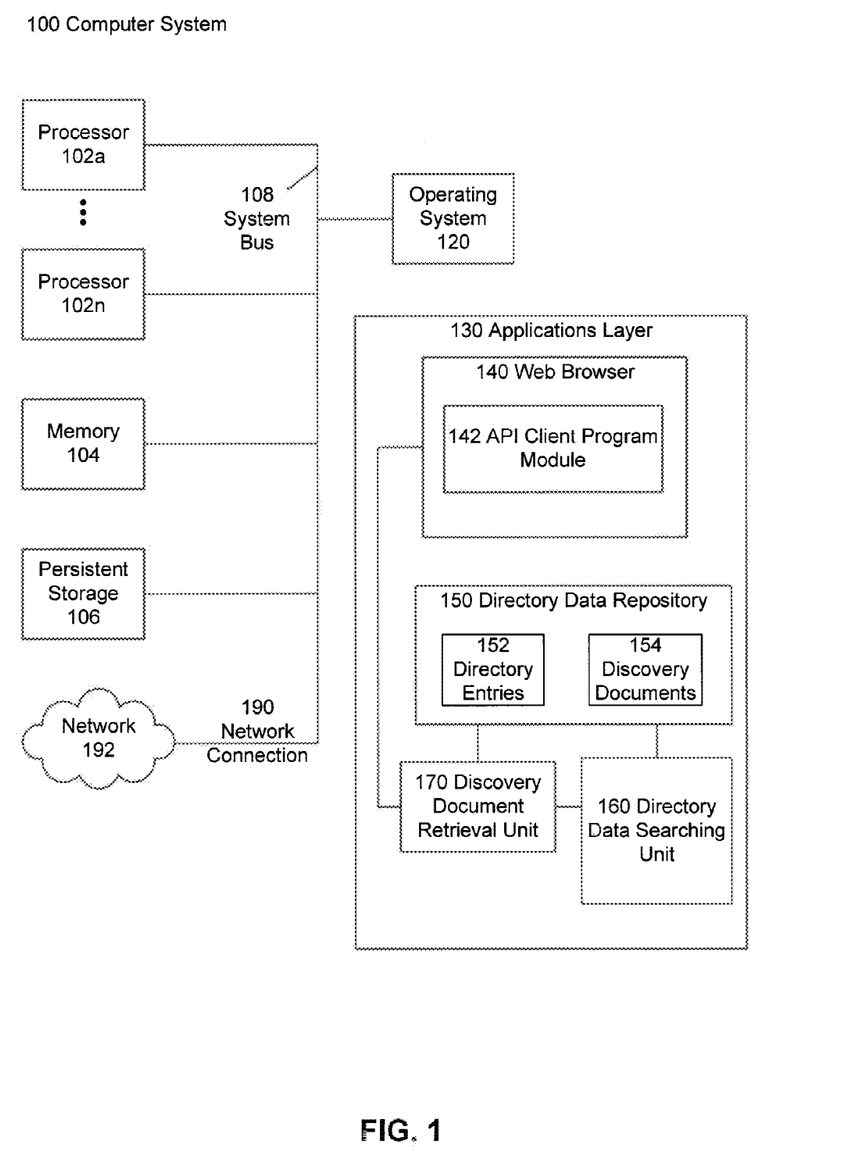
FIG. 1 is a diagram illustrating an exemplary system, according to an embodiment.

FIG. 1 is a diagram illustrating an exemplary system, according to an embodiment. In embodiments, a computer system 100 provides for managing metadata related to application programming interfaces (APIs).

The diagram of FIG. 1 illustrates a computer system 100 that contains a combination of hardware, software, and firmware constituent parts that allow it to execute Web browser 140 in an application layer 130 with access to the Web over a network 192 via a network connection 190. Application layer 130 also executes an API client 142, that is a consumer of metadata related to an API. Computer system 100 may be a conventional computer such as a desktop or laptop PC, but it may additionally be any Web-enabled peripheral such as a game console, a tablet, a netbook or a smartphone. Computer system 100 as shown in FIG. 1 may be organized around a system bus 108, but any type of infrastructure that allows the hardware infrastructure elements of computer system 100 to communicate with and interact with each other may be used to function as this part of computer system 100.

The processing task in the embodiment of FIG. 1 is carried out by one or more processors $102a \ldots 102n$, but it should be noted that any type of processing technology may be used here, including multi-core processors, multiple processors, or distributed processors. Additional specialized processing resources such as graphics, multimedia, or mathematical processing capabilities, either in hardware or in software, may also be used as adjuncts or replacements for processors $102a \ldots 102n$ for certain processing tasks.

In order to manipulate data in an embodiment, processors $102a \ldots 102n$ access a memory 104 via system bus 108. For data which needs to be stored more permanently, processors $102a \ldots 102n$ access persistent storage 106. Processors $102a \ldots 102n$, memory 104 and persistent storage 106 operate in coordination with operating system 120 to provide basic functionality for computer system 100. Operating system 120 provides support functionality for applications layer 130. In the context of the applications layer 130, computer system 100 executes a web browser 140 that provides a user access to information related to APIs, provided over network 192 via network connection 190 from a server 180 that includes a directory data repository 150, including directory entries 152 and discovery documents 154.

While web browser 140 may allow a user the ability to navigate metadata about APIs, computer system 100 also automates the API metadata information access process. Computer system 100 includes an API client 142, which requires information about how to interface with an API. Example API clients 142 are discussed further in FIG. 3.

Computer system 100 may use network connection 190 to communicate with other processing machines via network 192. Network connection 190 may be a wired connection such as Ethernet, token ring, or optical, DSL, cable, or phone connections in conjunction with an appropriate modem. Similarly, appropriate wireless technology may be used to act as network connection 190 to access network 192. Network 192 may be the Internet, a local area network, or any other network of machines with which computer system 100 may exchange data.

Using network connection 190 to communicate with server 180 via network 192, server 180 provides a directory data repository 150 that contains metadata related to the APIs, stored as directory entries 152 and discovery documents 154. In an exemplary embodiment, directory entries 152 and discovery documents 154 are transmitted in JavaScript Object Notation (JSON) format and are accessed by network requests. However, other data representation formats that provide access to structured information may be used in various embodiments.

In order to make the network requests, in one embodiment API client 142 may employ, in applications layer 130, a discovery document retrieval unit 170, which operates in conjunction with directory data searching unit 160 to search directory data repository 150 to retrieve information including directory entries 152 and discovery documents 154 from server 180. The network requests may be made by directory document retrieval unit 170, directory data searching unit 160, and directory data repository via network connection 190 and network 192. The format and contents of directory entries 152 and discovery documents 154 are discussed in greater detail in conjunction in FIGS. 4-5, below.

Discovery document retrieval unit 170 may further operate in tandem with a client library building unit 172 at applications layer 130 to produce custom client libraries based on the discovery document. This process is discussed in greater detail, below.

Each of the constituent parts of a system embodiment may be implemented on any computer system 100. Such computer system 100 can include, but is not limited to, a personal computer, mobile device such as a mobile phone, workstation, embedded system, game console, television, set-top box, or any other computer system 100. Further, computer system 100 can include, but is not limited to, a device having a processor and memory for executing and storing instructions. Software may include one or more applications and an operating system. Hardware can include, but is not limited to, a processor, memory and graphical user interface display. Computer system 100 may also have multiple processors and multiple shared or separate memory components. For example, computer system 100 may be a clustered computing environment or server farm.

Each of the constituent parts of a system embodiment may be implemented in hardware, software, firmware, or any combination thereof. Likewise, modules or instructions that constitute operative parts of embodiments may utilize any type of structured memory, including a persistent memory. In examples, each data storage infrastructure may be implemented as a relational database.

It should be noted that computer-readable medium embodiments may include any physical medium which is capable of encoding instructions that may subsequently by used by a processor to implement methods described herein. Example physical media may include floppy discs, optical discs (e.g. CDs, mini-CDs, DVDs, HD-DVD, Blu-ray), hard drives, punch cards, tape drives, flash memory, and memory chips. However, any other type of tangible, persistent storage that can serve in the role of providing instructions to a processor may be used to store the instructions in these embodiments.

Each of the information storage parts of the computer system 100 may be stored in any type of structured memory, including a persistent memory. In examples, such a persistent memory may be implemented as a database, including a relational database.

Overview of the Method

Figure 2:
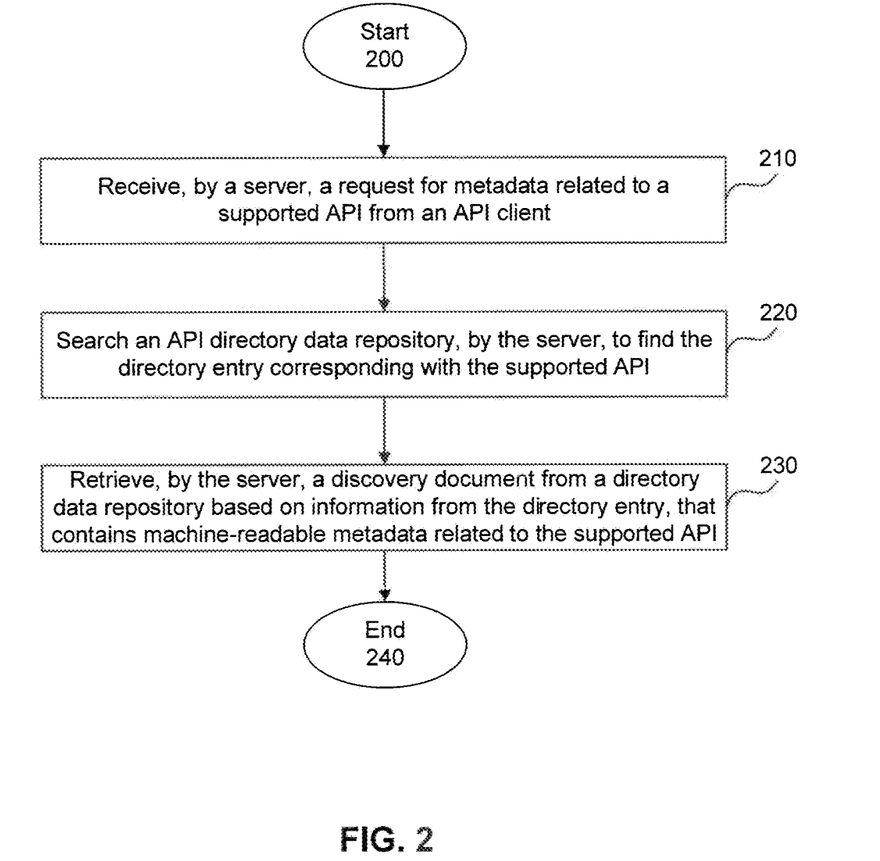
FIG. 2 is a flowchart of an exemplary method, according to an embodiment.

FIG. 2 is a flowchart of an exemplary method, according to an embodiment. In FIG. 2, a computer-implemented method is provided for managing access to metadata related to APIs. The computer-implemented method includes several stages, from 200 to 250. The computer-implemented method begins at stage 200, Start.

Stage 210 includes receiving, by a server, a request for metadata related to a supported API from an API client. For example, a request for metadata may be received at server 180 from computer system 100.

Stage 220 includes searching an API directory data repository, by the server, to find the directory entry corresponding with the supported API. Stage 220 may be performed, in an exemplary embodiment, by directory data searching unit 160, accessing directory entries 152 within directory data repository 150 on server 180 via network connection 190 over network 192.

Stage 230 includes retrieving a discovery document from the directory data repository by the server, based on information from the directory entry, that contains machine-readable metadata related to the supported API. Stage 230 may be performed, in an exemplary embodiment, by directory data searching unit 160, accessing discovery documents 154 within directory data repository 150 based on directory entries 152 on server 180 via network connection 190 over network 192.

The method ends at stage 240, End.

The computer-implemented method offers several advantages over prior approaches to managing API metadata. It facilitates automatic, easy approaches to accessing metadata by clients of the APIs. This accessing of metadata is discussed further in FIG. 3, below.

Figure 3:
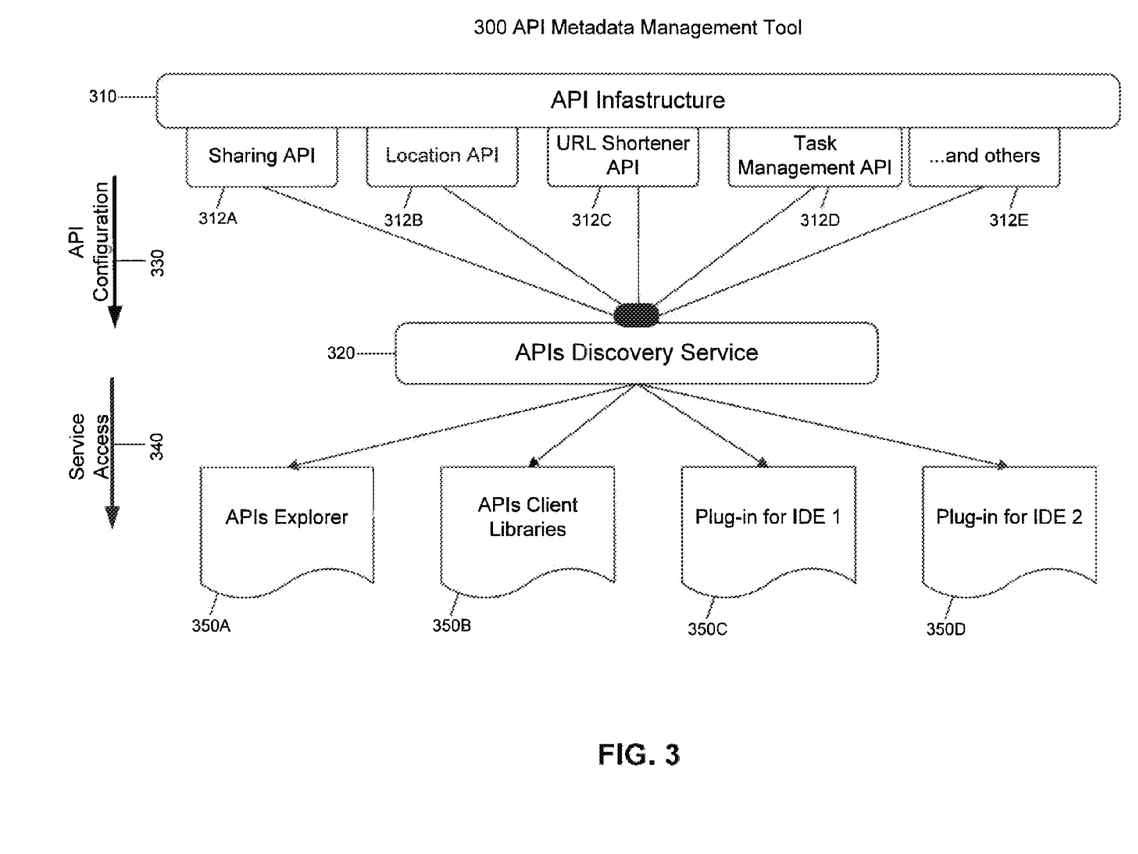
FIG. 3 is an overall view of dataflow, according to an embodiment.

FIG. 3 is an overall view of dataflow, according to an embodiment. FIG. 3 represents an API metadata management tool 300. API metadata management tool 300 includes an API infrastructure 310. API infrastructure 310 may encompass a variety of APIs, including a sharing API 312A, a location API 312B, a URL shortener API 312C, a task management API 312D, and others 312E. These APIs are generic API types, and embodiments may include other types of APIs, and implementations by different vendors of APIs for their products.

APIs 312A-E are accessed by an API discovery service 320. As discussed below, API discovery service 320 may access metadata from API infrastructure 310 to provide information about API configuration 330. The information about API configuration 330 is processed to allow service access 340. Clients are allowed service access. Example clients, which may utilize API metadata management tool 300 in a variety of embodiments, include an APIs explorer 350A, APIs client libraries 350B, a plug-in for IDE (Integrated Development Environment) 1 350C, and a plug-in for IDE 2 350D. These clients process metadata related to APIs to be used in various software engineering applications.

In general, information about API infrastructure 310 is stored in directory data repository 150 at server 180. Directory data repository includes directory entries 152 and discovery documents 154 that pertain to specific APIs, such as, for example, sharing API 312A or Location API 312B. APIs discovery service 320 operates by the operation of discovery document retrieval unit 170, and provides information to API client 142. API client 142 may correspond with example clients 350A-350D as discussed above.

Figure 4:
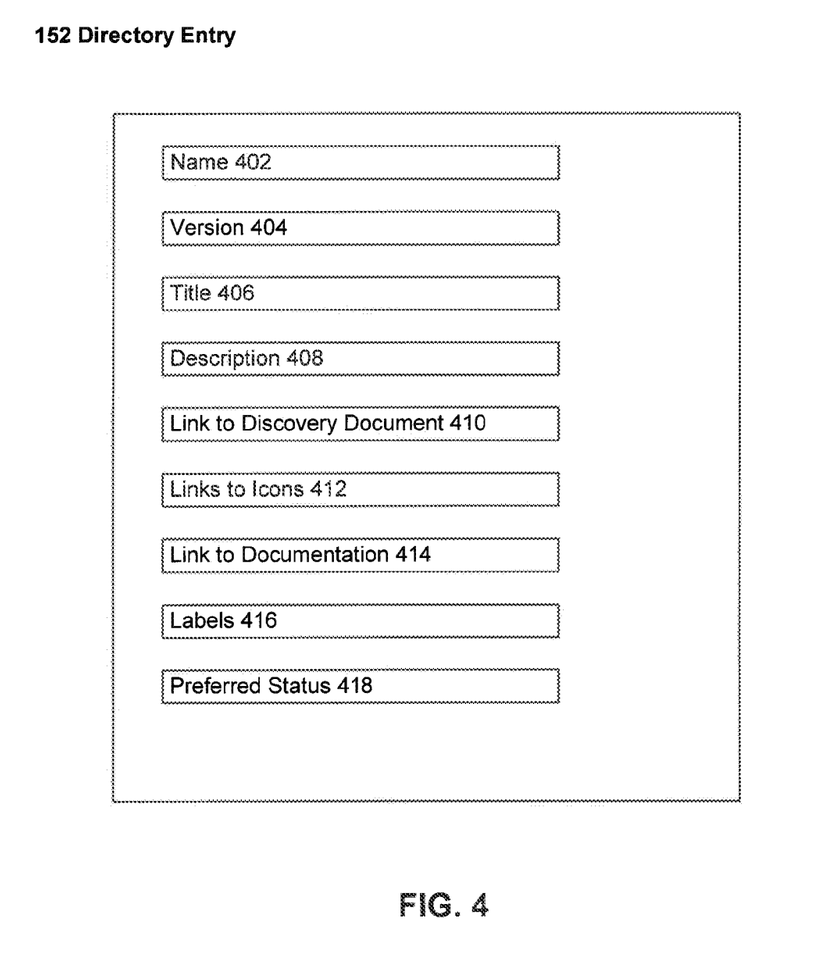
FIG. 4 is a listing of the contents of a directory entry.

FIG. 4 is a listing of the contents of a directory entry.

As can be seen in FIG. 4, a directory entry 152 may include a name 402, a version 404, a title 406, a description 408, a link to a discovery document 410, links to icons 412, a link to documentation 414, labels 416, and preferred status 418.

Figure 5:
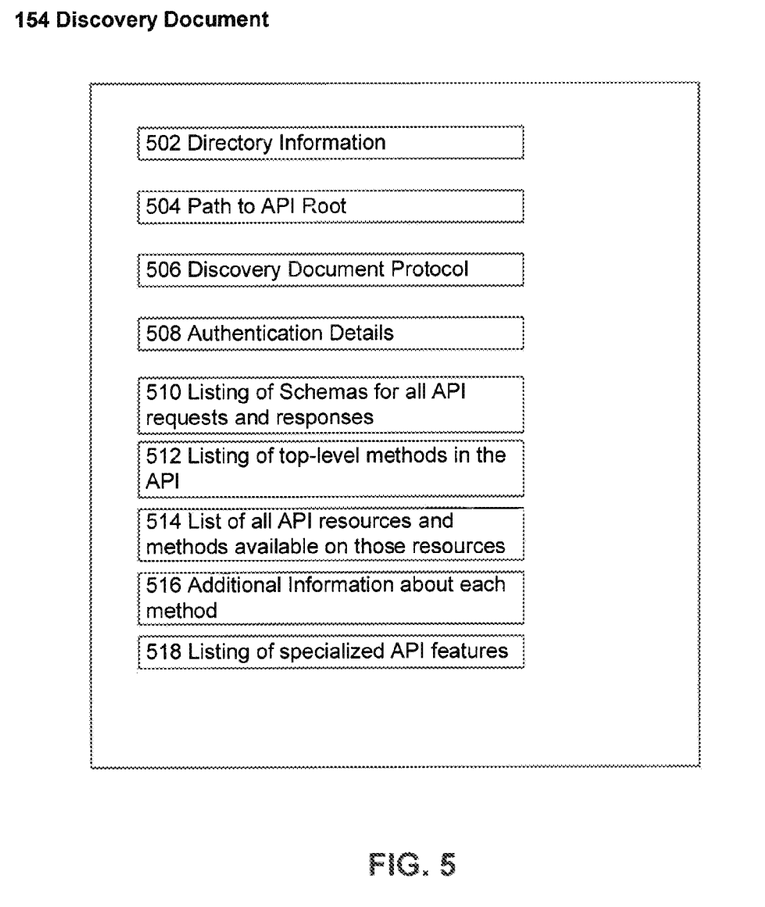
FIG. 5 is a listing of the contents of a discovery document.

FIG. 5 is a listing of the contents of a discovery document.

As can be seen in FIG. 5, discovery document 154 may include directory information 502 (as provided in FIG. 4), the path to the API root 504, a discovery document protocol 506, authentication details 508, a listing of schemas for all API requests and responses 510, a list of top-level methods in the API 512, a list of all API resources and methods available on those resources 514, additional information about each method 516, and a listing of specialized API features 518.

Various embodiments provide for various additional features that help define and extend the capabilities of certain embodiments. For example, in exemplary embodiments the directory entries 152 and discovery documents 154 may be transmitted in JavaScript Object Notation (JSON). While other machine-readable metadata storage formats exist, such as XML, JSON can be easily and efficiently parsed, and is thus a good choice to store the metadata. Also, the APIs themselves use JSON. However, it should be noted that embodiments are not limited to JSON, and other formats and protocols may be used.

Additionally, directory entries 152 may store a link to the discovery document 410. Such a link may be used to access the discovery document 154 that corresponds with a discovery entry 152 in directory data repository 150.

When accessing the directory and the discovery document, the requests may be made using HTTPS. HTTPS characterizes the interaction between API client 142 and directory data repository 150, discovery document retrieval unit 170, and directory data searching unit 160 that provide it with information. As noted above, this interaction via network connection 190 over network 192 may transmit information in JSON format. Moreover, because the connection is made with HTTPS, the connection is secure, helping to protect the security and session integrity for API client 142. However, other network protocols may be used in various embodiments, depending on the configuration of network connection 190 and network 192.

As discussed in FIG. 5, the discovery document 154 may include a variety of information. It should be noted that specific embodiments specifically include specific information in discovery document 154. For example, discovery document 154 may include a list of API-specific properties 518, authentication information for the API 508, information about the resources provided by the API 514, or information about the methods provided the API 512. As discussed below, in certain exemplary embodiments information may be stored in key-value format, such as the key-value format provided by JSON.

Another feature of certain embodiments is that embodiments may provide for building a custom client library based on the discovery document. Such building may be carried out by a custom client library building unit 172, which may be integrated into discovery document retrieval unit 170 and base the custom client library on discovery document 154 within directory data repository 150.

Embodiments are intended for developers who want to write client libraries, IDE plugins, and other tools for interacting with APIs. The APIs Discovery Service allows a user to accomplish all of these tasks by exposing machine readable metadata about other APIs through a simple API.

In certain exemplary embodiments, calls to the API are unauthenticated, JSON-based, network requests that use SSL, i.e. URLs begin with https. However, embodiments may use other protocols for information transmission, storage, and retrieval based upon the configuration of the embodiments, as long as the protocols provide sufficient functionality for API clients 142.

Example Data Format

JSON (JavaScript Object Notation) is a common Internet format that provides a simple method of representing arbitrary data structures. JSON is a text format that is completely language-independent but uses conventions that are familiar to programmers of the C-family of languages, including C, C++, C# Java, JavaScript, Perl, Python, and many others. However, various embodiments may use other data formats for representing the metadata for the APIs, as long as they provide functionality that is comparable to that described for JSON, below.

APIs Discovery Service Concepts

The APIs Discovery Service is built upon two basic concepts:

Directory of Supported APIs is a list of all APIs that are supported by the APIs Discovery Service. Directory entries 152 are stored on server 180.

Discovery Document is a machine readable description of a particular API. Discovery documents 154 are stored on server 180.

Directory of Supported APIs

The APIs Directory can be accessed by discovery document retrieval unit 170 by executing an unauthenticated HTTP GET request. An example of the HTTP request, in an exemplary JSON-based embodiment, is
GET https://www.googleapis.com/discovery/v1/apis However, other protocols may be used as discussed above, and other web addresses may be used for other API Directories as applicable.

The response includes information related to an API Directory. For instance, continuing the JSON example from above:

of accessing APIs and can be retrieved by executing an unauthenticated HTTP GET request. However, other protocols may be used as discussed above, and other web addresses may be used for various Discovery document 154 embodiments. For instance, continuing the example from above, the HTTP request may be part of a GET request.

In addition to the information provided in the APIs Directory 152, a Discovery document 154 also may include (though is not limited to):

A list of API resource schemas based on JSON Schema.

A list of API methods and available parameters for each method.

A list of available OAuth scopes.

Inline documentation of schemas, methods, parameters and available parameter values.

Example Discovery Document Format

This section explores the format of the Discovery document 154 in more detail.

All the examples below will use the Discovery document 154 from a URL Shortener API 312C. The syntax used in

```
{
    "kind": "discovery#directoryList",
    "items": [
        {
            "kind": "discovery#directoryItem",
            "id": "urlshortener:v1",
            "name": "urlshortener",
            "version": "v1",
            "title" : "URL Shortener API",
            "description": "Lets you create, inspect, and manage goo.gl short URLs",
            "discoveryLink": "./apis/urlshortener/v1/rest",
            "icons": {
                "x16": "http://www.google.com/images/icons/product/search-16.gif",
                "x32": "http://www.google.com/images/icons/product/search-32.gif"
            },
            "documentationLink":
"http://code.google.com/apis/urlshortener/v1/getting_started.html",
            "labels": [
                "labs"
            ],
            "preferred": true
        },
        ...
    ]
}
```

This information may characterize the APIs associated with the Directory entries. Each supported API can have multiple Directory entries, one for each of its supported versions.

A Directory entry 152 for a specific API version may contain at least four types of information. For example, the Directory entry may include information including the following (though not limited to):

Identification and description information provided by, e.g., name, version, title and description fields.

Documentation information provided by, e.g., icons and documentation link fields.

Status information provided by, e.g., labels and preferred fields.

Discovery document link provided by, e.g., a discovery link field. Such a discovery document link may provide access to the Discovery document 154 corresponding with the directory entry. As an example, the link may be a relative Uniform Resource Identifier (URI) to a discovery website.

Discovery Document

The Discovery document 154 describes the surface for a particular version of an API. It may provide various methods these examples is purely for illustrative purposes, and embodiments are not limited to the specific syntax or programming languages referenced herein. In an embodiment, the Discovery document 154 for the URL Shortener API 312C can be loaded by executing an HTTPS GET request.

The following discussion is meant to provide a general overview of each section of the Discovery document, along with helpful tips on how to use the document.

API-Level Properties

The Discovery document begins with a set of API-specific properties. Following is an example of API-specific properties in JSON, though other data representation languages may be used which provide similar functionality:

```
"kind": "discovery#restDescription",
"name": "urlshortener",
"version": "v1",
"title": "Lets you create, inspect, and manage goo.gl short URLs",
```

-continued

```
"description": "Lets you create, inspect, and manage goo.gl short URLs",
"protocol": "rest",
"basePath": "/urlshortener/v1/",
```

These properties include details about a particular version of an API. In this JSON example, these properties include the name, version, title and description. The protocol will usually have a fixed value of rest, as the APIs Discovery Service may include RESTful methods of accessing the APIs, such as HTTPS.

The basePath field indicates the path prefix for this particular API version.

Authentication

In a JSON embodiment, for example, the auth section contains details about the OAuth 2.0 auth scopes for the API.

The auth section contains a nested oauth2 and scopes section. The scopes section is a key-value mapping from the scope value to more details about the scope. For instance, the following is an example of an auth section in JSON format, that may represent authentication settings for an API.

```
"auth": {
    "oauth2": {
        "scopes": {
            "https://www.googleapis.com/auth/urlshortener": {
                "description": "Manage your goo.gl short URLs"
            }
        }
    }
},
```

Depending on the authentication setup of specific embodiments, the format and contents of the auth section may differ appropriately, so long as there is similar functionality. The auth section only defines the scopes for a particular API. To learn how these scopes are associated with an API method, consult the Methods section below.

Resources and Schemas

The operations of an API act on data objects called resources. The Discovery document 154 is built around the concept of resources. Each Discovery document 154 has a top-level resources section that groups all the resources associated with the API. For example, the URL Shortener API has a url resource.

Depending on the setup of specific embodiments, the format and contents of the resources section may differ appropriately, so long as there is similar functionality. Inside each resource section are the methods associated with that resource. For example, in a JSON embodiment, URL Shortener API 312C has three methods associated with the url resource: get, list and insert.

Schemas describe what the resources in an API look like. Each Discovery document 154 has a top-level schemas section, which contains a name-value pair of schema ID to object. Schema IDs are unique per API, and are used to uniquely identify the schema in the methods section of the Discovery document 154.

In an exemplary embodiment, APIs Discovery Service uses JSON Schema draft 3 to represent schemas. Fois a snippet of the JSON Schema for the Url resource, along with an actual response resource. The following is provided as being illustrative only. This example shows how a schema defines a data framework, and how a response associates data with the schema. However, alternative techniques may additionally be used that provide similar functionality in terms of defining a data framework and associating specific data with the data framework.

| Url Resource JSON Schema | Actual Url Resource response |
|---|---|
| ```
{
    "id": "Url",
    "type": "object",
    "properties": {
        "analytics": {
            "$ref": "AnalyticsSummary",
        },
        "id": {
            "type": "string",
            "description": "..."
        },
        "kind": {
            "type": "string",
            "description": "...",
            "default": "urlshortener#url"
        },
        "longUrl": {
            "type": "string",
            "description": "..."
        }
    }
}
``` | ```
{
    "id": "http://goo.gl/maps/1CGE";
    "kind": "urlshortener#url",
    "longUrl": "http://maps.google..."
```  |

The bolded fields indicate how the response properties are represented in this example by JSON Schema, in that each of the fields describes information that is to be associated with it. However, alternative approaches may allow for other ways of describing the data.

Schemas may also contain references to other schemas. This can help client library developers to effectively model the objects of an API in their data model classes. In the Url example above, the analytics property is actually a reference to a schema with ID AnalyticsSummary. Within the schemas section, embodiments contain the AnalyticsSummary schema. The value of this schema can be substituted for the analytics property in the Url resource (Note that the $ref syntax comes from the JSON Schema specification). However, alternatives may be used to interrelate different conceptual definitions, so long as functionality that is similar to that of the exemplary JSON schemas is provided.

Methods may also reference schemas when indicating their request and response bodies. Refer to the Methods section for more details.

Methods

The core of the Discovery document is built around methods. Methods are the operations that can be performed on an API. The methods section may be found in various areas of the Discovery document, including at the top-level (called API-level methods) or at the resources level. For instance, example syntax for a JSON representation of the methods section is provided below. However, other data representation languages and other formats for the method section may be used in certain embodiments, depending on the structure of a given embodiment.

```
"methods": {
    // API-level methods
}
"resources": {
    "resource1": {
        "m0ethod": {
            // resource-level methods
        }
        "resources": {
            "nestedResource": {
                "methods": {
                    // methods can even be found in nested-resources
                }
            }
        }
    }
}
```

While an API may have API-level methods, a resource requires a methods section in order to be complete. Each methods section is a key/value map from method name to other details about that method.

Finally, each methods section details various properties about that method. Following is an example of the get method, in JSON, though the format of section details may vary from embodiment to embodiment:

```
"get": {
    "id": "urlshortener.url.get",
    "path"; "url",
    "httpMethod": "GET",
    "description": "Expands a short URL or gets creation time and analytics.",
    "response" : { "$ref": "Url"},
    "parameters": { // parameters related to the method },
}
```

This exemplary section contains general method details such as a unique id to identify the method, the httpMethod to use, and the path of the method (for details on how to use the path property to calculate the full method url, see the Composing the request section). In addition to these general method properties, there are a few properties that connect the method with other sections in the Discovery document 154:

Scopes

The auth section defined earlier in this application contains information about all the scopes supported by a particular API. If a method supports one of these scopes, it will have a scopes array. In an embodiment, there may be one entry in this array for each scope supported by the method. Note that choosing an auth scope for use in an application depends on various factors such as which methods are being called and what parameters are sent along with the method. Therefore, the decision of which scope to use is left to the developer. Discovery only documents which scopes are valid for a method.

Request and Response

If a method has a request or response body, these may be documented, for example, in the request or response sections, respectively. In the get example above, the method may be defined by a response body. Example JSON code for the response follows, though alternative formats adapted to the needs of specific embodiments may be used:

"response": {"$ref": "Url"},

The syntax above indicates that the response body is defined by a JSON Schema with an id of Url. This schema can be found in the top-level schemas section. Both request and response bodies may use the $ref syntax for referring to schemas.

Parameters

If a method has parameters that should be specified by the user, these parameters should be documented in the method-level parameters section. This section may contain a key/value mapping of the parameter name to more details about that parameter. For instance, sample JSON code for the parameters section may include:

```
"parameters": {
    "shortUrl": {
        "type": "string",
        "description": "The short URL, including the protocol.",
        "required": true,
        "location": "query"
    },
    "projection": { ... }
},
"parameterOrder": [
    "shortUrl"
],
```

Alternative formats that provide equivalent functionality may also be used. In the example above, there are two parameters for the get method: shortUrl and projection. Parameters can either go in the path or the URL query; the location property indicates where the client library should put the parameter.

There are many other properties describing the parameter, including the parameter data type (useful for strongly-typed languages), whether the parameter is required, and whether the parameter is an enum.

Certain languages, such as Java, may want to provide a method with a fixed parameter ordering for making requests. The parameterOrder array provides a hint as to how the parameters to the client method should be ordered. The parameterOrder array lists the name of each parameter in order of significance. Following the example above, a Java method signature may be as follows:

```
public Request get(String shortUrl, Map<String, Object>
optionalParameters);
```
Note that this is only an example, and actual method signatures may vary. The parameterOrder can contain either path or query parameters, but in this example, every parameter in the array is required.

Inline Documentation

Each Discovery document 154 may be annotated with a number of description fields that provide inline documentation for the API. For instance, using the JSON examples as provided above for illustration, description fields can be used for the following API elements:
- API itself
- OAuth scopes
- Resource schemas
- API Methods
- Method parameters
- Acceptable values for certain parameters These fields are especially useful if a developer wishes to use the APIs Discovery Service to generate human readable documentation for a client library, e.g. JavaDoc.

Features

Even with all the API documentation above, there are some cases where APIs support custom features outside the scope of the Discovery document 154. These are collected in the features array. The features array contains a string label for each special feature supported by the API. It is possible to define any value here, and that value will define a set of behaviors for the API. For instance, in JSON, a dataWrapper feature indicates that all requests/responses to the API are wrapped in a data JSON object. This was a feature of older APIs, but is being deprecated moving forward.

In this JSON example, as a client library developer, if an API supports the "dataWrapper" feature, it is important to do the following.
1. On requests: wrap the request resource in a data JSON object
2. On responses: The resource can be found inside the data JSON object.

The schemas in the Discovery document 154, in an embodiment, may not generally contain the data wrapper, so the developer is usually responsible for adding and removing them. For example, it may be assumed that there is an API with a resource named "Foo" that looks like this (in a piece of example JSON code):

```
{
    "id": 1,
    "foo": "bar"
}
```

Before inserting this resource using the API, the resource may be wrapped in a data element like so (in a piece of example JSON code):

```
{
    "data": {
        "id": 1,
        "foo": "bar"
    }
}
```

On the flip side, get response from the API may also contain the data wrapper (in a piece of example JSON code):

```
{
    "data": {
        "id": 1,
        "foo": "bar"
    }
}
```

In order to get the resource defined by the schema, the data wrapper should be removed (in a piece of example JSON code):

```
{
    "id": 1,
    "foo": "bar"
}
```

Building a Client Library Using APIs Discovery Service

The APIs Discovery Service may be used for building a variety of different tools to use with APIs. However, one purpose of the Discovery document 154 is to power the creation of client libraries in various programming languages. This section discusses how one could go about building a custom client library for APIs.

A stable and feature-complete client library is a complicated tool that can take months to develop. However, the general instructions for building a simple client library for APIs can be broken down to three simple steps:
1. Fetching the Discovery document 154 and constructing API surface
2. Composing a request
3. Making a call and fetching the response These steps are reviewed in more detail in the following sections.

Step 1: Fetching the Discovery Document 154 and Constructing API Surface

When beginning to implement a client library there are some decisions up front that can guide a developer down a path. A programming language of choice may be either typed or untyped, and if is typed it could be either statically or dynamically typed. The programming language may be compiled or interpreted. Those decisions will guide a developer on how the developer consumes and uses the Discovery document 154.

At this point a developer has to fetch the Discovery document 154, and based on the developer's answers to the above questions the developer will have a strategy for when the document is to be fetched. In a strongly statically compiled language the developer will want to fetch the Discovery document 154 early in the process and from there generate code to specifically handle the API that is described by the Discovery document 154. For a strongly-typed language that could mean doing code generation and building a compiled library. For a dynamically typed language the creation of the programming structures to interface to the API can be lazily constructed on the fly as the programming surface is used.

Step 2: Composing a Request

Composing a requests involves two separate steps:
1. Composing the request body
2. Constructing the request URL The request body, if any, should be converted from a language appropriate representation into the correct wire format. For example, in a Java client library there may be a class for each request type that allows type-safe manipulation of the request data and is serializable into JSON.

The construction of the request URL is a slightly more complicated process.

The path property of each method in the API uses URI Template v04 syntax. This property may contain variables, which are surrounded by curly braces. By way of illustration, here is an example of a path property with variables:
/example/path/{var}

The var is a variable. The value for this variable comes from the Discovery document's parameters section. Each variable name has a corresponding value in the parameters object. In the example above, there will be a parameter named var in the parameters section (and its location property will be path, to indicate that it is a path variable).

When making a request, the value for var should be substituted into the url. For instance, continuing the example above, if the user of the library sets var to the value foo, the new url will be /example/path/foo.

Also note that the path property is a relative URI. In order to calculate the absolute URI, a developer should follow these steps:
1. Start with the absolute URI of the Discovery document 154. In the URL Shortener 312C example, the Discovery document 154 is retrieved from (as a sample network request):
https://www.googleapis.com/discovery/v1/apis/urlshortener/v1/rest
2. Grab the basePath property from the top-level of the Discovery document 154. The basePath property may be either an absolute or relative URI. If it is a relative URI, combine it with the URI from step #1. In the URL Shortener 312C example, the basePath property is:
/urlshortener/v1/
When combined with step #1, the URI would be (continuing the example):
https://www.googleapis.com/urlshortener/v1/v1/
3. Grab the path property, expand it as a URI Template, and combine the results of that expansion with the URI from step #2. In the URL Shortener 312C example for the get method, the path is url, so the full URI for the method would be (continuing the example):
https://www.googleapis.com/urlshortener/v1/url Step 3: Making a Call and Fetching the Response Once the request is sent the response should be deserialized into the appropriate language representation, taking care to handle error conditions that could occur, both in the underlying HTTP transport and error messages generated from the API service. The errors follow a standardized format.

Usage Examples

The best way to learn how to use the APIs Discovery Service is by looking at some examples.

Simple APIs Client

Below is an example of a very simple client library written in Python. The client builds an interface for interacting with the URL Shortener API 312C, then shortens a URL using that interface.

The code below is a significantly simplified version of a typical client library. It is an incomplete implementation that is provided to demonstrate some aspects of building a client library. It is not production ready code.

It should be noted that the Python code is simply designed to illustrate a sample use case for building a client library. Actual use cases may vary from language to language and from API. The following code is merely included so as to illustrate how embodiments may process metadata to build a client library. Following the code, commentary discussing the steps followed in the code is provided to clarify the approach taken to build a client library.

| URL Shortener API Code (Example Only) |
| --- |
| import httplib2 |
| import json |
| import uritemplate |
| import urllib |
| import urlparse |
| # Step 1: Fetch Discovery document |
| DISCOVERY_URI = |
| "https://www.googleapis.com/discovery/v1/apis/urlshortener/v1/rest" |
| h = httplib2.Http( ) |
| resp, content = h.request(DISCOVERY_URI) |
| discovery = json.loads(content) |
| # Step 2.a: Construct base URI |
| BASE_URI = urlparse.urljoin(DISCOVERY_URI, discovery['basePath']) |
| class Collection(object): pass |
| def createNewMethod(name, method): |
|     # Step 2.b Compose request |
|     def newMethod(**kwargs): |
|         body = kwargs.pop('body', None) |
|         url = urlparse.urljoin(BASE_URI, uritemplate.expand(method['path'], kwargs)) |
|         for pname, pconfig in method.get('parameters', { }).iteritems( ): |
|             if pconfig['location'] == 'path' and pname in kwargs: |
|                 del kwargs[ ] pname] |
|         if kwargs: |
|             url = url + '?' + urllib.urlencode(kwargs) |
|         return h.request(url, method=method['httpMethod'], body=body, |
|                 headers={'content-type': 'application/json'}) |
|     return newMethod |
| # Step 3.a: Build client surface |
| def build(discovery, collection): |
|     for name, resource in discovery.get('resources', { }).iteritems( ): |
|         setattr(collection, name, build(resource, Collection( ))) |

-continued

URL Shortener API Code (Example Only)

```
    for name, method in discovery.get('methods', { }).iteritems( ):
        setattr(collection, name, createNewMethod(name, method))
    return collection
# Step 3.b: Using the client
service = build(discovery, Collection( ))
print service.url.insert(body= '{"longUrl": "http://www.google.com/"}')[ ]
```

The following discussion refers to the steps described generally above, and clarifies how they are used in an actual application by the Python code in conjunction with the URL Shortener API 312C.

Step 1: Fetch Discovery Document

The Discovery document 154 for the URL Shortener API 312C is retrieved and parsed into a data structure. Since Python is a dynamically typed language, the Discovery document 154 can be fetched at runtime.

Step 2.a: Construct base URI

The base URI is calculated.

Step 2.b: Compose Request

When a method is called on a collection the URI Template is expanded with the parameters passed into the method, and parameters with a location of query are put into the query parameters of the URL. Finally a request is sent to the composed URL using the HTTP method specified in the Discovery document 154.

Step 3.a: Build client surface

The client surface is built by recursively descending over the parsed Discovery document 154. For each method in the methods section a new method is attached to the Collection object. Because collections can be nested we look for resources and recursively build a Collection object for all of its members if one is found. Each nested collection is also attached as an attribute to the collection object.

Step 3.b: Using the Client

This demonstrates how the built API surface is used. First a service object is built from the Discovery document 154, then a new URL is shortened via URL Shortener API 312C by inserting a long URL into the url collection.

Thus, embodiments incorporate a variety of features in new and advantageous ways. Embodiments provide for easily and conveniently managing API metadata by using standardized technologies such as JSON and HTTPS. Thus, it becomes easy for clients to access features related to APIs. For example, it is easy to build client libraries based on APIs because the information is stored in a standardized manner. APIs can be explored as well, or used as plug-ins in IDEs. Because APIs have metadata stored in similar ways, different APIs can provide for similar applications and usage techniques.

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for managing access to metadata related to application programming interfaces (APIs), the method comprising:
receiving, by a server, a request for metadata related to one or more APIs from an API client;
searching, by the server, an API directory based on the request, the API directory having a plurality of APIs each of which have a respective directory entry and a respective discovery document, to find a directory entry corresponding with the request, the directory entry having a link to a location of a discovery document;
parsing the directory entry to obtain the link to the location of the discovery document; and
retrieving, by the server, the discovery document from the API directory based on the link in the directory entry, that contains machine-readable metadata related to one or more functions of the one or more APIs.

2. The computer-implemented method of claim 1, wherein the directory entry and discovery document are transferred in JavaScript Object Notation (JSON) format.

3. The computer-implemented method of claim 1, wherein the directory and the discovery document are each accessed using HTTPS.

4. The computer-implemented method of claim 1, wherein the discovery document comprises a list of API-specific properties.

5. The computer-implemented method of claim 1, wherein the discovery document comprises authentication information for the API.

6. The computer-implemented method of claim 1, wherein the discovery document comprises information about the resources provided by the API.

7. The computer-implemented method of claim 1, wherein the discovery document comprises information about the methods provided by the API.

8. The computer-implemented method of claim 7, wherein the information about the methods is stored in key-value format.

9. The computer-implemented method of claim 1, further comprising: building a custom client library based on the discovery document.

10. A system for managing access to metadata related to application programming interfaces (APIs), the system comprising:
- one or more processors, configured to receive a request for metadata at a server related to one or more APIs from an API client;
- a directory data repository, configured to store directory entries and discovery documents corresponding to a plurality of APIs;
- a directory data searching unit, configured to search the directory data repository based on the request to find a directory entry corresponding with the request, the directory entry having a link to a location of a discovery document; and
- a discovery document retrieval unit, configured to:
- parse the directory entry to obtain the link to the location of the discovery document;
- retrieve the discovery document from the directory data repository, based on the link in the directory entry, that contains machine-readable metadata related to one or more functions of the one or more API.

11. The system of claim 10, wherein the directory entry and discovery document are transferred in JSON format.

12. The system of claim 10, wherein the directory and the discovery document are each accessed using HTTPS.

13. The system of claim 10, wherein the discovery document comprises a list of API-specific properties.

14. The system of claim 10, wherein the discovery document comprises authentication information for the API.

15. The system of claim 10, wherein the discovery document comprises information about the resources provided by the API.

16. The system of claim 10, wherein the discovery document comprises information about the methods provided by the API.

17. The system of claim 16, wherein the information about the methods is stored in key-value format.

18. The system of claim 10, further comprising:
- a client library building unit configured to build a custom client library based on the discovery document.

19. A computer readable storage medium having instructions stored thereon that, when executed by one or more processors, cause the processors to execute a method for managing access to metadata related to application programming interfaces (APIs), the method comprising:
- receiving, by a server, a request for metadata related to one or more APIs from an API client;
- searching, by the server, an API directory based on the request, the API directory having a plurality of APIs each of which have a respective directory entry and a respective discovery document, to find a directory entry corresponding with the request, the directory entry having a link to a location of a discovery document;
- parsing the directory entry to obtain the link to the location of the discovery document; and
- retrieving, by the server, the discovery document from the API directory based on the link in the directory entry, that contains machine-readable metadata related to one or more functions of the one or more APIs.

* * * * *

UNITED STATES PATENT AND TRADEMARK OFFICE
CERTIFICATE OF CORRECTION

Page 1 of 1

PATENT NO. : 8,577,914 B2
APPLICATION NO. : 13/110866
DATED : November 5, 2013
INVENTOR(S) : Monsur Hossain et al.

It is certified that error appears in the above-identified patent and that said Letters Patent is hereby corrected as shown below:

In the Claims:

Column 19, line 27, Claim 10, please replace "one or more API" with --one or more APIs--.

Signed and Sealed this
Twenty-ninth Day of April, 2014

Michelle K. Lee
*Deputy Director of the United States Patent and Trademark Office*